United States Patent

BEST AVAILABLE COPY

[11] 3,610,809

| [72] | Inventor | Lester K. Eigenbrod |
| | | Grand Island, N.Y. |
| [21] | Appl. No. | 875,115 |
| [22] | Filed | Nov. 10, 1969 |
| [45] | Patented | Oct. 5, 1971 |
| [73] | Assignee | Union Carbide Corporation |
| | | New York, N.Y. |

[54] POROUS VAPOR-COOLED ELECTRICAL CONDUCTORS
19 Claims, 7 Drawing Figs.

[52] U.S. Cl. .................................................. 174/15, 174/126
[51] Int. Cl. .................................................. H01b 7/34
[50] Field of Search .......................................... 174/DIG. 6, 15, 15 C, 16, 126; 335/216; 333/99; 62/DIG. 12

[56] References Cited
UNITED STATES PATENTS

| 2,797,392 | 6/1957 | Clogston ...................... | 174/126 X |
| 2,927,953 | 3/1960 | Staller ........................... | 174/126 X |
| 3,349,161 | 10/1967 | Latham ......................... | 174/15 |

FOREIGN PATENTS

| 1,490,519 | 6/1967 | France ......................... | 174/15 |

Primary Examiner—Lewis H. Myers
Assistant Examiner—A. T. Grimley
Attorneys—Paul A. Rose, Thomas I. O'Brien, John C. Le Fever and Lawrence C. Kastriner ABSTRACT: Disclosed is a vapor-cooled, porous electrical conductor of nonconstant cross-sectional area having high current capacity and high coolant consumption efficiency. These conductors require substantially less cryogenic refrigeration at all ampere loadings up to rated load than do previously known fluid-cooled conductors.

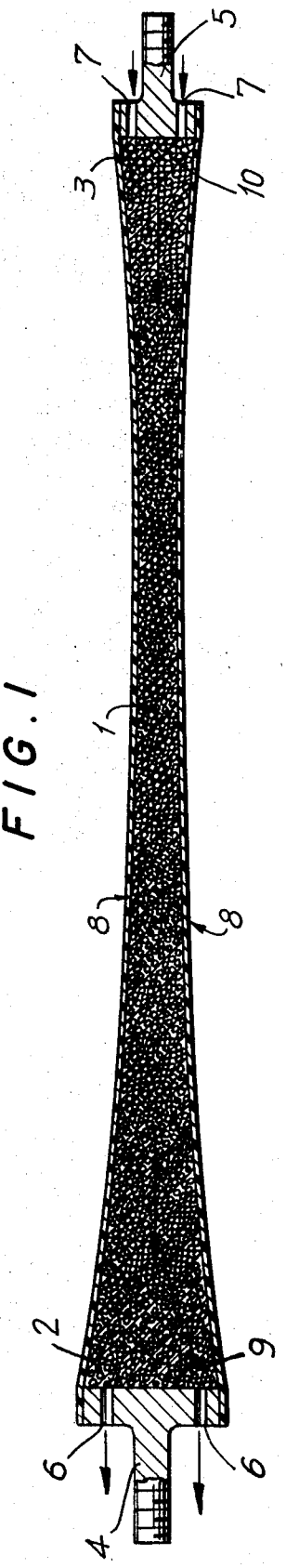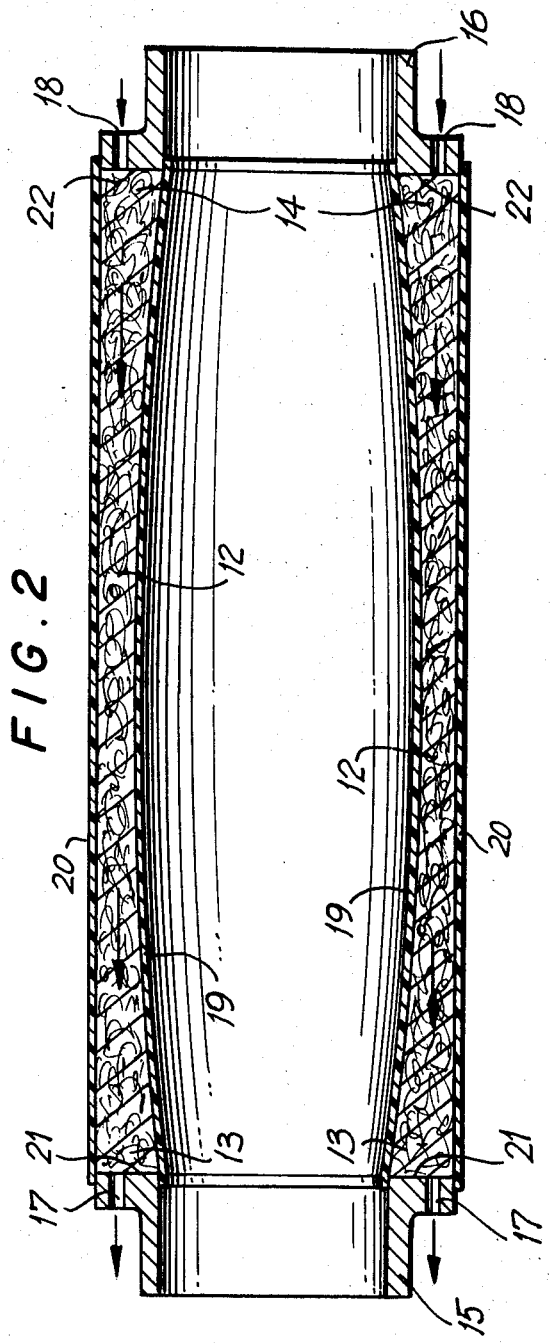

INVENTOR
LESTER K. EIGENBROD

PATENTED OCT 5 1971 3,610,809

INVENTOR
LESTER K. EIGENBROD
BY John C. Widmer
ATTORNEY

POROUS VAPOR-COOLED ELECTRICAL CONDUCTORS

This invention relates to variable cross section, porous, vapor-cooled electrical conductors.

In cryogenically cooled and superconducting power transmission systems special intermediate conductors are needed to connect the cold or superconducting electrical cables to the ambient temperature electrical conducting lines. Such conductors often must have high ampere carrying capacity, and are usually arranged to be internally cooled with a cryogenic vapor. Cooling is required to extract resistive heat formed by current passing through the conductor as well as to extract heat longitudinally conducted from the ambient temperature end to the cold end of the conductor. To be economically feasible these conductors must be capable of accommodating a varying range of currents at low coolant consumption rates. Although the basic idea of vapor-cooled electrical conductors is not new, the art has not provided a satisfactory vapor-cooled conductor possessing both extremely high current capacity and good coolant consumption economy.

An object of this invention is to provide a vapor-cooled electrical conductor having both high ampere capacity and high coolant consumption efficiency over its operating range.

Other objects will be apparent from the disclosure, drawings and appended claims.

SUMMARY OF THE INVENTION

Disclosed herein is a vapor-cooled, electrical conductor having a warm end, a cold end and a central portion therebetween, an electrically conductive porous structure extending end-to-end for flow of cooling cryogenic vapor from the cold end to the warm end thereof, and electrical current introducing and removal means joined to each end of said porous structure: the improvement comprising a porous structure with warm and cold ends each having cross-sectional areas which exceed the cross-sectional area of the central portion of such porous structure.

DESCRIPTION OF THE DRAWINGS

FIG. 1 is a longitudinal cross-sectional view of a porous metal conductor of this invention.

FIG. 2 is a longitudinal cross-sectional view of a compressed wire mesh conductor of this invention.

DETAILED DESCRIPTION

Figure 3:
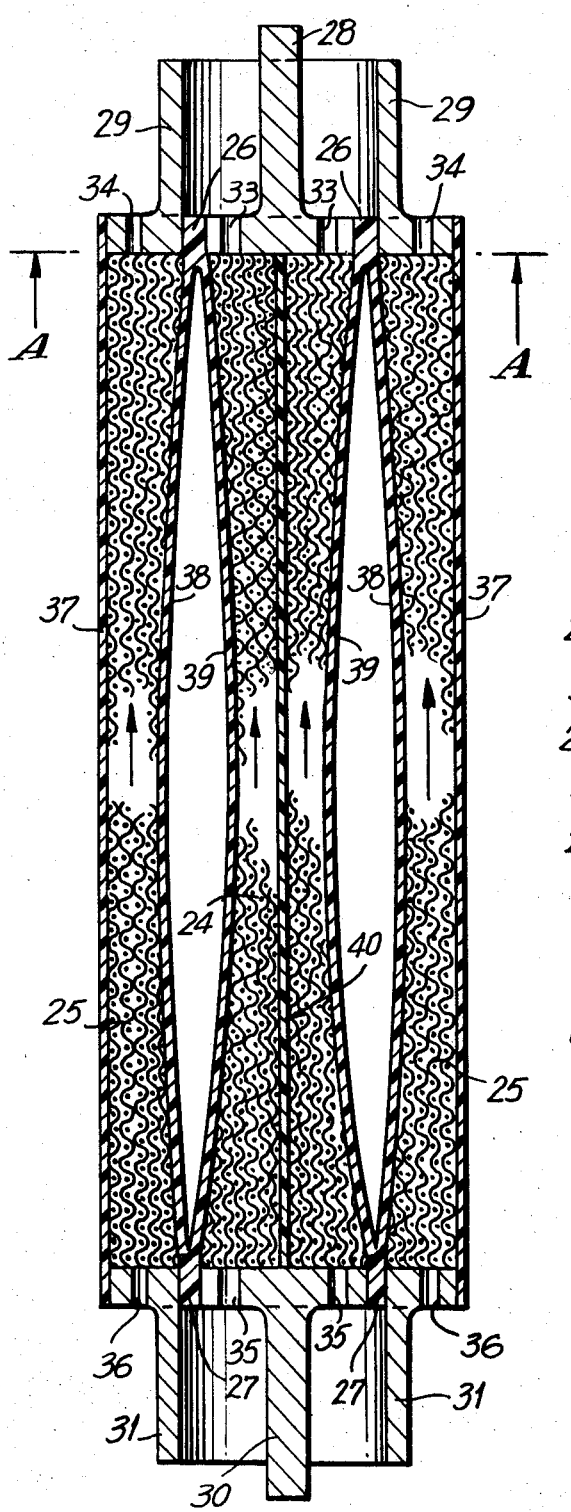
FIG. 3 is a longitudinal cross-sectional view of an embodiment incorporating the configurations of FIGS. 1 and 2 but using metal screen wire as the conductor.

It has been found that vapor-cooled porous intermediate conductors having a decreasing-increasing cross-sectional area, with large cross-sectional areas at the ends and with a smaller area therebetween, have the capability of conducting high electrical currents such as encountered in electric utility practice, e.g., 10,000 amperes with high coolant consumption efficiency. These conductors have high electrical conductivity, i.e., low resistivity, to minimize resistive or Joule heating produced by current flow therein. In addition, these conductors have low thermal conductivity to minimize undesirable heat conduction along their lengths from the warm to the cold ends thereof. Unfortunately, these properties are not readily compatible because a large cross-sectional area is desirable to minimize Joule heating in the conductor and to provide sufficient surface area for cooling, whereas a small cross-sectional area is desirable to minimize longitudinal heat conduction. Thus, a solution was needed to meet both these design considerations satisfactorily which, in addition, took into consideration the fact that both the electrical and thermal conductivities varied with temperature.

A further consideration was that as much heat as possible should be intercepted at as high a temperature as possible by the cooling vapor to give best results. This latter requirement means that adequate heat transfer area must be provided in each portion of the conductor to permit the heat present at that point to be carried away at low temperature difference.

The above design considerations were expressed mathematically using a nonlinear, second order differential equation which was derived based on the assumption of zero temperature difference between the cooling fluid and the conductor at all points along its length. This equation is given below:

$$\dot{m} C p \frac{dT}{dx} = kA \frac{d^2T}{dx^2} + k \left(\frac{dT}{dx}\right)\left(\frac{dA}{dx}\right) + A \left(\frac{dk}{dT}\right)\left(\frac{dT}{dx}\right)^2 + \left(\frac{\rho I}{A}\right)^2 \quad (1)$$

wherein $m$ is the flow rate of cooling gas, $C$ is the cooling gas specific heat, $T$ is temperature at point $x$, $x$ is the distance along the conductor from one end, $k$ is the conductor's thermal conductivity, $A$ is the cross-sectional area of the conductor, and $\rho$ is the conductor's electrical resistivity.

Equation (1) was solved for various points along the conductor length by finite difference methods using appropriate values of $\rho$, and the area distribution obtained in terms of the other variables. Results unexpectedly revealed that in going from the warm to the cold end the cross-sectional area of the conductor decreases in the central portion, then increases again towards the cold end. In general, a conductor having its cross-sectional area decrease from the warm end to the central portion and increase from the central portion to the cold end, preferably in a continuous and uninterrupted manner, has been found to have coolant consumption efficiency superior to intermediate conductors of constant or continually decreasing cross-sectional area. Furthermore it has been found that the conductors of this invention should preferably have a central portion cross-sectional area of less than 0.8 that of either end.

A rigorous approach to preparing conductors of this invention would be to conform the cross-sectional areas of the warm end, cold end and central portion to equation (1) supra.

To achieve sufficient heat transfer from the conductor to the cooling vapor, an electrically conductive porous material was deemed necessary. By "porous material" is meant a three-dimensional porous electrically conductive material with a void space volume to total volume ratio great enough to provide adequate heat transfer surface area within the conductor to remove at each point in the conductor the resistive and conductive heat present at that point along the conductor, and to permit fluid passage therethrough without substantial flow resistance. The porous structure must also permit uniform gas flow through the conductor so that the coolant contacts substantially all heat transfer surfaces. Such porous material may possess homogenous or directional porosity, i.e., different porosity in the longitudinal and transverse directions, so long as the above requirements of coolant flow and heat transfer are met and, in addition, such porous material must provide electrical continuity from one end of the conductor to the other. It has been found that for a cubic unit volume of porous conductive material suitable for achieving best results in this invention, considering handleability and heat transfer efficiency, the ratio of heat transfer surface area within the unit volume to electrically conductive area within one face of the unit volume transverse to the direction of current flow should be about 400 to about 1,200.

It has been calculated that conductors of this invention cooled with helium at cryogenic temperatures consume from 0.002 to 0.010 liters of helium per ampere hour; the conductors most closely conforming to the cross-sectional area requirements of equation (1) having the lowest consumption rates.

Some porous metal electrical conductors envisioned for use in this invention include spirally wound metal screen or expanded or perforated metal sheet. Metal foam, which may be prepared by known procedures such as casting a metal into spaces surrounding small balls which are subsequently removed leaving the metal foam structure, is also considered suitable as well as superimposed layers of metal screen sintered to each other to form a unified structure, hot-rolled screen wire and sintered or brazed laminated metal mesh, and the like. Copper or copper alloy would be the preferred electrically conductive metal. Examples of copper alloys are 90–10 brass and zirconium copper.

The method of spirally winding porous metal sheet such as screen wire into a shape such that the cross-sectional area of the central portion is less than that of either end is claimed in copending application Ser. No. 875,326 filed Nov. 10, 1969 in the name of Hugh M. Long, together with the broad concept of a spirally winding electrically conductive porous metal conductors of any longitudinal configuration and is not part of the present invention.

FIG. 1 is a longitudinal, cross-sectional view of an embodiment of this invention wherein the electrically conductive porous portion of a conductor is shaped as a concave surface of revolution having a minimum cross-sectional area in the central portion 1 and greater cross-sectional areas at warm end 2 and cold end 3. Terminal members 4 and 5 are provided at the ends of the porous portion of the conductor having circularly distributed coolant flow passages 6 and 7 respectively provided in terminal members 4 and 5 to accommodate coolant flow through the conductor. Gas-impervious coating 8 is provided on the exposed porous material surface with sufficient overlap onto terminals 4 and 5 to assure containment of coolant gas which enters the conductor through passages 7, passes through the porous material portion of the conductor as indicated by flow direction arrows, and exits through passages 6. Such gas-impervious coatings are preferably of low heat conductive and nonelectrically conductive material, such as thin walled heat shrinkable plastic tubing, polyimide sheet film, polytetrafluoroethylene sheet or polyurethane impregnated crepe paper. Epoxy may be used as a sealant and bonding material. End terminals 4 and 5 are made of solid electrically conductive material and are arranged to uniformly distribute electrical current over warm and cold end interfaces 9 and 10 respectively. Such interfaces may be formed by soldering, brazing or the like the porous conductor material, which in FIG. 1 is foam metal, to the contiguous end terminal material.

FIG. 2 is a longitudinal, cross-sectional view of another embodiment of this invention wherein the electrically conductive porous portion of the conductor is shaped as a hollow cylinder having its inner surface formed as a convex surface of revolution with a cross-sectional area minimum in the central portion 12 and greater at the warm end 13 and the cold end 14. Terminal members 15 and 16 are provided at the ends of the porous portion of the conductor having circularly distributed coolant flow passages 17 and 18 respectively provided in terminal members 15 and 16 to accommodate coolant flow through the conductor. Gas-impervious coatings 19 and 20 are provided on the exposed porous material surfaces with sufficient overlap onto terminals 15 and 16 to assure containment of coolant gas which enters the conductor through passages 18, passes through the porous material portion of the conductor as indicated by flow direction arrows, and exits through passages 17. End terminals 15 and 16 are made of solid electrically conductive material and are arranged to uniformly distribute electrical current over warm and cold end interfaces 21 and 22 respectively. Such interfaces may be formed by soldering, brazing or the like the porous conductor material, which in FIG. 2 is brazed wire matting, to the contiguous end terminal material. FIG. 3 is a longitudinal, cross-sectional view of an embodiment of this invention having an inner spirally wound screen wire porous conductor 24 and a concentrically aligned outer spirally wound screen wire porous conductor 25. Said inner and outer porous conductors are united at the ends by insulators 26 and 27, and are connected to their respective end terminal members 28, 29, 30 and 31. Said terminal members 28, 29, 30 and 31 have circularly distributed coolant flow passages 33, 34, 35 and 36 respectively which accommodate coolant flow through the conductor. Cooling gas separately enters the inner and outer porous conductors through passages 35 and 36 respectively, is restrained to flow through the porous metal conductors by gastight coatings 37, 38 and 39 having low thermal and preferably no electrical conductivity, and exits through passages 33 and 34 respectively. A nonconductive plug 40 has been inserted along the axis of the inner conductor to fill a hole formed therein during its manufacture. The porous metal conductor of this embodiment comprises spirally wound metal screen which has substantially uniform current distribution properties. Optionally, the contiguous screen-wire layers may be soldered together or otherwise bonded to improve transverse current conduction without interfering with coolant flow therethrough.

Although the conductors thus far described are of circular and annular cross section, the invention is not limited to such configurations. Further, it should be noted that the end terminal posts may be of virtually any length but only such length as is required to make proper electrical connection with the porous, variable area portion is considered to be part of this invention.

Figure 4:
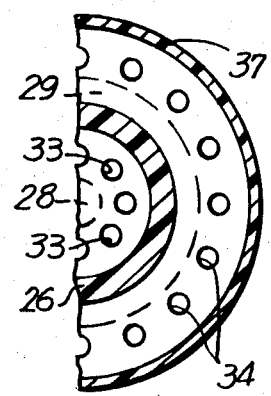
FIG. 4 is a section view taken along A—A of FIG. 3.

FIG. 4 is an end view of the cross-sectioned conductor of FIG. 3 taken along section line A—A wherein the circularly distributed passages 33 and 34 of inner and outer terminals 28 and 29 respectively are clearly shown. Insulator 26 which separates terminals 28 and 29 is also seen as is gastight coating 37.

Figure 5:
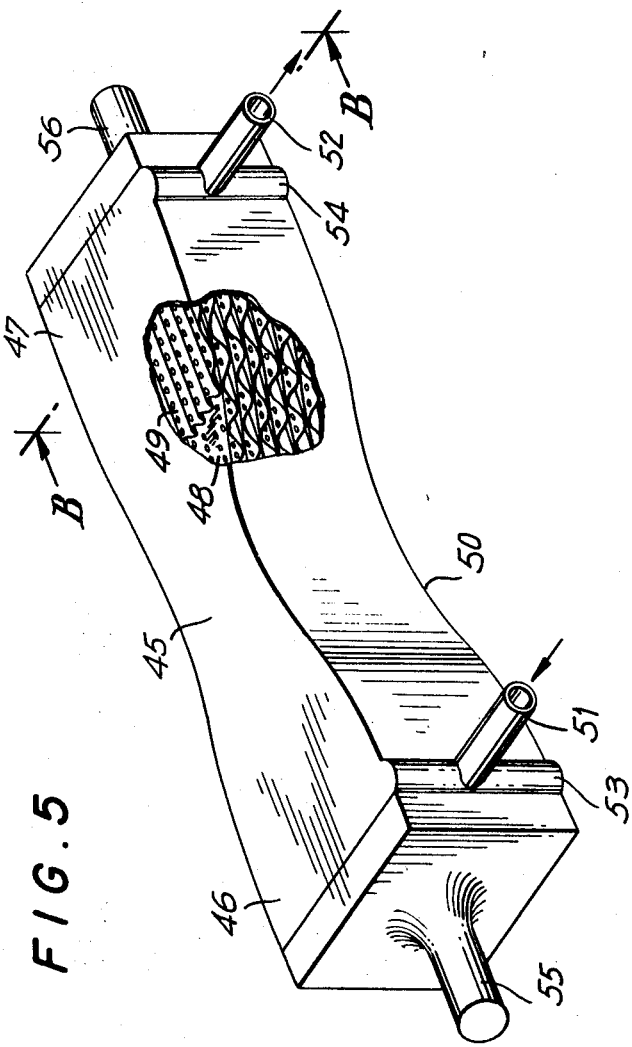
FIG. 5 is a partially sectioned perspective view of a corrugated sheet metal electrical conductor of this invention.

FIG. 5 is a partially sectioned perspective view of another embodiment of this invention comprising essentially plate-and-fin type heat exchanger construction. The heat exchanger portion is the porous electrically conductive portion of the conductor having a minimum cross-sectional area in the central portion 45 and larger cross-sectional areas at the cold end portion 46 and the warm end portion 47. Longitudinally oriented perforated metal plates 48 are separated by thin, closely spaced, perforated, corrugated fins 49 and the plates and fins are bonded together as by brazing. The plates and fins could be contoured either before or after assembly to have the cross-sectional area variation shown in FIG. 5. The plate-and-fin assembly is gastightly sealed within a container 50, which may be made of epoxy joined polytetrafluoroethylene sheet preferably more than 0.004 inch thick having coolant conduit means 51 and 52 incorporated therein along with manifold portions 53 and 54 which aid in making uniform the coolant flow. Coolant would enter conduit means 51, flow into the plate-and-fin assembly with the aid of manifold 53, pass through the assembly and exit through conduit 52 with the assistance of manifold 54. The conductor ends are gastightly sealed by terminals 55 and 56 which are bonded to contiguous plates and corrugated fins. The fins and plates would be perforated to promote turbulent coolant flow therethrough. Typical fin dimensions would be 0.008- inch-thick × 0.02-inch-high corrugations × 18 fins per inch spacing; plate thickness would be 0.020 to 0.030 inch.

Figure 6:
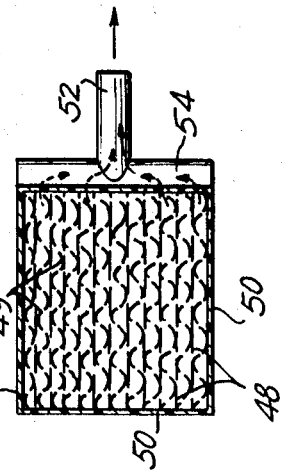
FIG. 6 is a cross-sectional view along B—B of FIG. 5.

FIG. 6 is an end section view of the conductor of FIG. 5 along section line B—B. Note fins 49, plates 48, container walls 50, coolant flow arrows, manifold 54 and conduit means 52.

Figure 7:
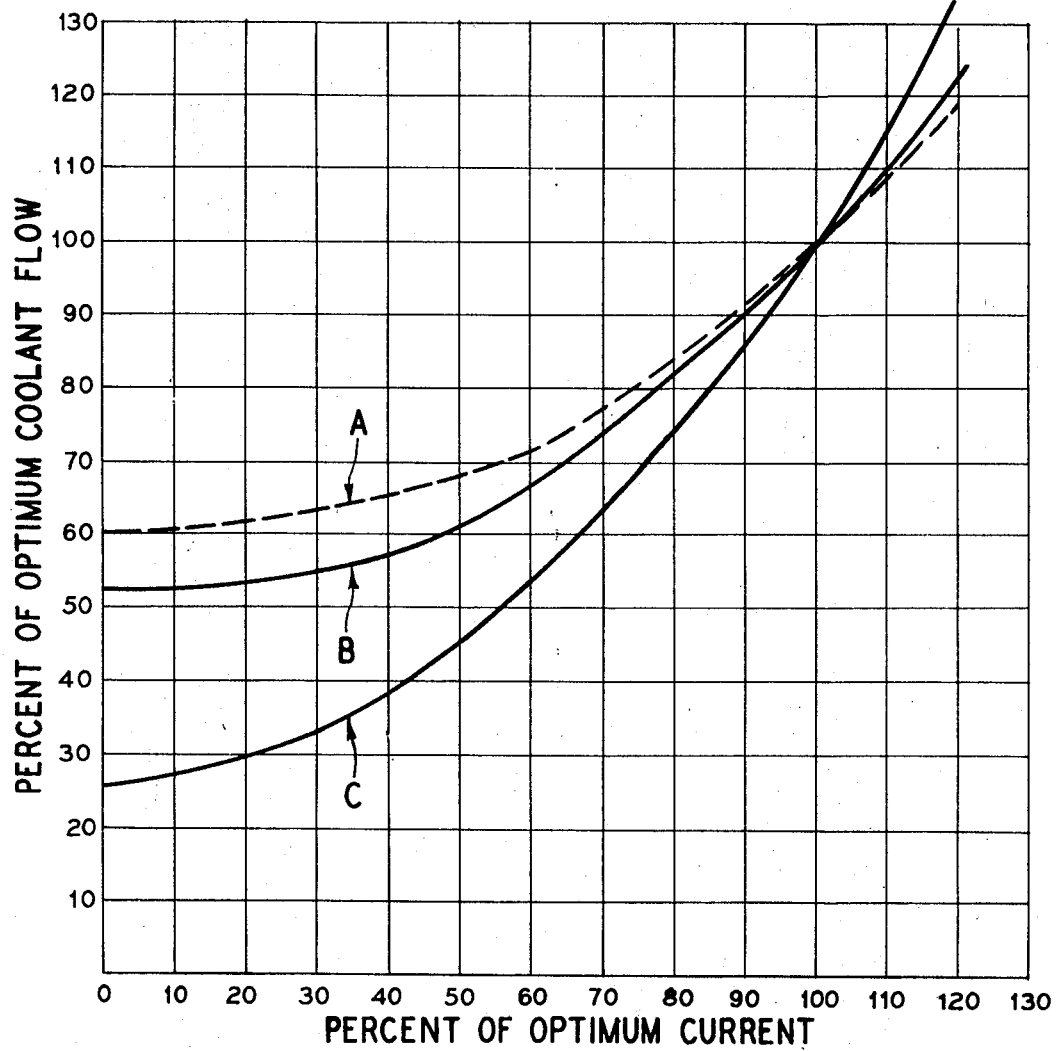
FIG. 7 is a comparative graphic representation of the coolant efficiencies of various types of porous, vapor-cooled electrical conductors.

FIG. 7 represents a comparison of coolant consumption characteristics of three types of intermediate conductors. Curve A is characteristic of constant area conductors such as those described by K. R. Efferson in *Review of Scientific Instruments*, 38, 1776 (1967). That article describes constant area electrical conductors comprising silver-plated copper wires woven into the shape of cylindrical tubes and arranged in parallel sets disposed to permit the passage of cryogenic coolant vapor therethrough.

Curve B is characteristic of conductors having decreasing cross-sectional area from the ambient temperature end to the cold end. More specifically, curve B represents a conductor comprising a series of sets of parallel nickel tubes which sets are joined at their ends by adapters with the sets decreasing in numbers of tubes from the warm end to the cold end, and further, with the tubes arranged to permit the passage of coolant therethrough. Curve C is characteristic of conductors of this invention manufactured consistent with equation (1) and shows a clear advantage in coolant consumption over curves A and B at all current values up to rated load, i.e., up to 100 percent of optimum current flow.

The following is an example of the structure and performance of one embodiment of this invention.

EXAMPLE 1

A 400 ampere intermediate conductor similar to that of FIG. 3 was prepared having inner and outer conductors 24 and 25 fabricated from spirally wound 90–10 brass, 30 mesh × 0.0135-inch-diameter wire cloth precut to give the desired cross-sectional area variation when wound. Terminal posts 28, 29, 30 and 31 were of copper and were bonded to conductors 24 and 25 using cast solder; gastight coatings 37, 38 and 39 were of polyurethane impregnated crepe paper; and nonconductive plug 40 was of five-sixteenth inch diameter polytetrafluoroethylene. Overall porous conductor portion dimensions were about 33 cm. length; 4 cm. warm end diameter, 5.2 cm. cold end diameter and 2.7 cm. central portion diameter.

The conductor of this example was designed by solving equation (1) using a finite difference technique. This technique repeatedly modified initially assumed conductor temperatures for each of 24 equal, longitudinal conductor segments until thermal equilibrium was established. Table I contains the calculated cross-sectional areas per segment and 30 mesh × 0.0135-inch-diameter screen-wire lengths having cross-sectional area equivalent to the calculated cross-sectional areas.

Spirally wound metal screen wire for use in making conductors of converging-diverging cross section is cut into a appropriate pattern prior to winding by laying the metal screen wire on a flat surface; cutting it to the desired conductor length and thereafter measuring perpendicularly from a straight longitudinal edge, along a series of equally spaced parallel lines, linear distances which correspond to cross-sectional areas desired for each conductor longitudinal segment represented by such equally spaced parallel lines; the linear distance equaling the desired cross-sectional area divided by the metal screen-wire metallic cross-sectional area per unit length. Therefore, each conductor segmental cross-sectional area has an equivalent screen-wire length such as is shown in TAble I for 30 mesh × 0.135-inch-diameter screen wire. Connecting the parallel line ends in a smooth curve and cutting along that curve would give a screen-wire pattern which when wound would have the desired cross-sectional converging-diverging area variation.

Apparatus for testing the conductor of this example comprised a transformer power supply, current measuring instrumentation, thermoelectric conductor temperature profile measuring instrumentation, coolant supply and control equipment, and the conductor itself. Helium gas was employed as the coolant.

Table II lists sample data obtained from experimental measurements of the conductor's electrical and thermodynamic properties.

TABLE I

Conductor Cross Section Area Variation With Length

| Segment 0 | Cross-sectional area at segment midpoint (cm.²) | Screen wire length having equivalent area (cm.) |
|---|---|---|
| 1 | 0.456 | 41.5 |
| 2 | 0.345 | 31.3 |
| 3 | 0.280 | 26.3 |
| 4 | 0.244 | 22.2 |
| 5 | 0.225 | 20.4 |
| 6 | 0.215 | 19.5 |
| 7 | 0.211 | 19.2 |
| 8 | 0.214 | 19.5 |
| 9 | 0.220 | 20.0 |
| 10 | 0.232 | 21.1 |
| 11 | 0.249 | 22.7 |
| 12 | 0.273 | 24.8 |
| 13 | 0.301 | 27.4 |
| 14 | 0.338 | 30.7 |
| 15 | 0.387 | 35.1 |
| 16 | 0.456 | 41.5 |
| 17 | 0.551 | 49.2 |
| 18 | 0.658 | 59.7 |
| 19 | 0.840 | 76.3 |
| 20 | 1.067 | 96.8 |
| 21 | 1.425 | 129. |
| 22 | 1.869 | 170. |
| 23 | 2.337 | 212. |
| 24 | 2.500 | 227. |

TABLE II

Experimental Results Using Helium Cooling Gas

| | | | | | | | |
|---|---|---|---|---|---|---|---|
| Lead current (amperes) | 0 | 80 | 142 | 280 | 360 | 400 | 450 |
| Total voltage drop (volts) | 0 | 0.071 | 0.115 | 0.225 | 0.305 | 0.335 | 0.46 |
| Inner conductor voltage drop (volts) | 0 | 0.036 | 0.062 | 0.115 | 0.152 | 0.168 | 0.232 |
| Outer conductor voltage drop (volts) | 0 | 0.034 | 0.058 | 0.105 | 0.153 | 0.168 | 0.231 |
| Gas flow through lead (cfh) | 18.1 | 10.4 | 18.2 | 46.8 | 53.6 | 54 | 79.2 |
| Gas pressure drop (inch water) | 0.5 | 0.08 | 0.2 | 0.4 | 1.1 | 1.3 | 3. |
| Gas inlet temperature (°F) | −452 | −443 | −442 | −430 | −412 | | −37 |
| Gas exit temp., inner conductor (°F) | −16 | 20 | 16 | −19 | 36 | 26 | 14 |
| outer conductor (°F) | −14 | 26 | 22 | −30 | 30 | 14 | 11 |
| Warm end terminal post temperature (°F) | 51 | 58 | 65 | 100 | 140 | 142 | 150 |

In summary, experimental measurements showed the minimum coolant consumption requirements to be 0.0051 liters of liquid He per ampere-hour at 440 amperes current. It was determined that current concentrations in the cast solder end portions of the conductor caused unusual heat buildup which when corrected would result in more ideal coolant consumption efficiency. This can be accomplished by using more conductive solder such as silver containing solder and longitudinally thicker end connectors. The end connectors of this conductor were about 0.5 cm. thick.

Testing of conductors in the 7,000 ampere operating current region has indicated that scaling up of such conductors presents no problem.

Although preferred embodiments of the invention have been described in detail, it is to be understood that modifications and variations may be effected without departing from the spirit and scope of the invention.

What is claimed is:

1. In a vapor-cooled, electrical conductor having a warm end, a cold end and a central portion therebetween, an electrically conductive porous structure extending end-to-end for flow of cooling crogenic vapor from the cold end to the warm end thereof, and electrical current introducing and removal means joined to each end of said porous structure: the improvement comprising a porous structure with warm and cold ends each having cross-sectional areas which exceed the cross-sectional area of the central portion of such porous structure.

2. A conductor as described in claim 1 wherein the cross-sectional area of the central portion is less than 0.8 that of either end.

3. A conductor as described in claim 1 wherein the cross-sectional area decreases from the warm end to the central portion and increases from the central portion to the cold end in a continuous and uninterrupted manner.

4. A vapor-cooled electrical conductor as described in claim 1 wherein the cross-sectional areas of the warm end, cold end and central portion thereof vary substantially as described by the following equation:

$$\dot{m} C_p \frac{dT}{dx} = \frac{kAd^2T}{dx^2} + k\left(\frac{dT}{dx}\right)\left(\frac{dA}{dx}\right) + A\left(\frac{dk}{dT}\right)\left(\frac{dT}{dx}\right)^2 + \left(\frac{\rho I}{A}\right)^2$$

wherein $m$ is the flow rate of cooling gas, $c_p$ is the cooling gas specific heat, $T$ is temperature at point $x$, $x$ is the distance along the conductor from one end, $k$ is the conductor's thermal conductivity, $A$ is the cross-sectional area of the conductor, and $\rho$ is the conductor's electrical resistivity.

5. A conductor as described in claim 1 having a coolant consumption range of from 0.002 to 0.010 liters of helium per ampere hour.

6. A conductor as described in claim 1 wherein the electrically conductive porous structure has a ratio of heat transfer surface area, within a cubic unit volume, to electrically conductive area, within one face of the cubic unit volume transverse to the direction of current flow, which ranges between about 400 and 1,200.

7. A conductor as described in claim 1 wherein the cross-sectional shape is substantially circular.

8. A conductor as described in claim 1 wherein the porous metal comprises spirally wound metal screen wire.

9. A conductor as described in claim 1 wherein the porous metal comprises metal foam.

10. A conductor as described in claim 1 wherein the porous metal comprises superimposed layers of metal screen sintered to each other.

11. A conductor as described in claim 1 wherein the porous metal comprises hot-rolled screen wire.

12. A conductor as described in claim 1 wherein the porous metal comprises sintered laminated metal mesh.

13. A conductor as described in claim 1 wherein the porous metal comprises brazed laminated metal mesh.

14. A vapor-cooled electrical conductor assembly comprising concentrically aligned inner and outer porous conductors each as described in claim 1; wherein the electrical current introducing and removal means comprise terminal members joined to each end of said inner and outer porous conductor; electrical insulator means disposed between said inner and outer porous conductors; gas-impermeable electrically nonconductive means over the inner and outer surfaces of said inner and outer porous conductors; and conduit means disposed at each end of said inner and outer porous conductors for introducing coolant gas to and discharging warmed gas from the electrically conductive porous structures of said inner and outer conductors.

15. A conductor as described in claim 1 wherein the electrically conductive porous structure is comprised substantially of copper.

16. A conductor as described in claim 1 wherein the electrically conductive porous structure comprises perforated, corrugated fins and perforated flat plates in alternating superimposed relation, terminal members comprising said electrical current introducing and removal means; an electrically nonconductive container gastightly enclosing said porous structure; and conduit means are disposed at the warm and cold ends of such porous structure for coolant flow from the cold end to the warm end.

17. A conductor as described in claim 1; wherein the electrical current introducing and removal means comprise terminal members joined to the warm and cold ends of such porous conductor; conduit means arranged in such terminal members for introducing coolant gas to and discharging warmed gas from the electrically conductive porous structure and gastight covering means on the outer surface of such porous conductor which restrains the coolant to flow through the electrically conductive porous structure.

18. A conductor as described in claim 1 wherein gas-impermeable electrically nonconductive means are disposed over the outer surface of said electrically conductive porous structure.

19. A conductor as described in claim 1 which conductor is hollow having an inner and outer surface, wherein gas-impermeable electrically nonconductive means is disposed over said inner and outer surfaces.